United States Patent [19]

Pulliam et al.

[11] Patent Number: 4,489,140

[45] Date of Patent: Dec. 18, 1984

[54] MULTI-LAYER ALUMINUM ALLOY BRAZING SHEET

[75] Inventors: Daniel L. Pulliam; John A. Evans, both of Terre Haute; David L. Wilbur, West Terre Haute; Robert D. Fox, Rosedale, all of Ind.

[73] Assignee: Atlantic Richfield Company, Los Angeles, Calif.

[21] Appl. No.: 391,768

[22] Filed: Jun. 24, 1982

[51] Int. Cl.³ .............................................. B32B 15/20
[52] U.S. Cl. ................. 428/654; 228/263.17
[58] Field of Search .................... 428/654; 228/263.17

[56] References Cited

U.S. PATENT DOCUMENTS 3,843,333 10/1974 Woods ............................... 428/654
4,161,553 7/1979 Vernam et al. ..................... 428/654
4,172,923 10/1979 Kawase et al. ....................... 420/540

OTHER PUBLICATIONS

Cubberly, W. et al.; *Metals Handbook*, 9th Ed., vol. 2, Am. Soc. for Metals, pp. 44-51 (1979).
*Registration Record of Aluminum Assoc. Desig. and Chemical Composition for Wrought Al and Wrought Al Alloys*, Alum. Assoc., p. 2 (1976).

Primary Examiner—L. Dewayne Rutledge
Assistant Examiner—Robert L. McDowell
Attorney, Agent, or Firm—James W. McClain; Stanley A. Becker; Blucher S. Tharp

[57] ABSTRACT

A composite brazing material is described, composed of a layer (usually an ingot) of high manganese content aluminum alloy (3000 series alloy; the "core") and a layer of high silicon content aluminum alloy (4000 series alloy; the "cladding") with a layer of aluminum alloy having the following composition:

| silicon | 6.8–8.2 wgt. % |
|---|---|
| iron | up to 0.8 wgt. % |
| copper | up to 0.25 wgt. % |
| manganese | up to 0.10 wgt. % |
| zinc | up to 0.20 wgt. % |
| other elements | up to 0.15 wgt. % |
| aluminum | balance | disposed between the cladding and core layers and in contact with both. Subsequent hot rolling of the multi-layer composite produces a good bond between the core and the cladding through the intermediate layer. The resulting brazing material has the external properties of a simple two-layer composite of core and cladding without the intermediate layer. The three layer composite of the present invention, however, has a much stronger interlayer bond and is not subject to the serious delamination or bond failures of the prior art two-layer materials. Additional composite layers can also be used, with a layer of the intermediate alloy as described herein placed between each successive pair of the 3000 and 4000 series alloy layers. One typical configuration is composed of a 3003 core, clad each side with 4104 alloy sheets and with a 4343 intermediate alloy sheet on either side of the core between the core and each cladding sheet.

5 Claims, No Drawings

MULTI-LAYER ALUMINUM ALLOY BRAZING SHEET

FIELD OF THE INVENTION

The invention herein relates to composite brazing materials. More particularly it relates to aluminum alloy brazing materials in which individual sheets of separate alloys are bonded together.

BACKGROUND OF THE PRIOR ART

Composite brazing materials composed of individual layers of aluminum alloy sheets, each sheet being made of a different alloy, have been known for some time. A typical brazing material which has found use in the automotive industry is described in U.S. Pat. Nos. 3,853,547 and 3,898,053 to O. R. Singleton, Jr. These patents describe a composite material formed of an alloy core made of 3000 series or 5000 series aluminum alloy core material clad on one or both sides with a 4104 aluminum alloy cladding sheet. Specific core materials mentioned are 3003, 3004, 3105, 5005, 5052 and 5457 alloys.

Bonds in the composite material directly between the high manganese content 3000 alloy series core and the high silicon content 4104 alloy cladding sheet are difficult to make, however. The failure of the materials to bond consistently during hot rolling formation, or the subsequently delamination of a poorly formed bond, causes significant waste of product and equipment time for the manufacturer. Consequently, it would be advantageous to have means which would provide for improved bonding in a composite brazing material between a high silicon content aluminum alloy cladding sheet and a high manganese content aluminum alloy core sheet.

BRIEF SUMMARY OF THE INVENTION

The invention herein is a composite brazing material comprising two aluminum alloy sheet layers which it is desired to bond together, these layers being separated by a third layer between them, the third layer serving as the bonding medium between the other two layers, with the two layers to be bonded being respectively composed of a high manganese content aluminum alloy sheet and a high silicon content aluminum sheet, with the intermediate bonding layer being an aluminum alloy having the composition:

| | | |
|---|---|---|
| silicon | 6.8-8.2 wgt. % | |
| iron | up to 0.8 wgt. % | |
| copper | up to 0.25 wgt. % | |
| manganese | up to 0.10 wgt. % | |
| zinc | up to 0.20 wgt. % | |
| other elements | up to 0.15 wgt. % total | |
| aluminum | balance | |

The composite materials of this invention can include more than these three layers as long as the intermediate bonding medium layer is placed between each pair of high manganese and high silicon aluminum alloy sheets which are to be bonded. In one preferred embodiment the composite material is a five layer composite with the two outer cladding layers each being a high silicon content aluminum alloy sheet, the central core layer being a high manganese content aluminum sheet, and containing two of the intermediate bonding medium layers described above with one intermediate layer sheet on either side of the core to bond the core to the external cladding sheets.

DETAILED DESCRIPTION AND PREFERRED EMBODIMENTS

The invention herein is a composite brazing material composed of at least three layers and intended to provide a structure in which there is a secure bond between a high manganese content aluminum alloy (such as a 3000 series alloy) with a high silicon content aluminum alloy sheet (such as a 4000 series alloy). In a particular embodiment, the invention is intended to provide for enhanced bonding between the layers of a composite with a 3000, 3004 or 3105 core sheet and 4004 or 4104 cladding sheets bonded to one or both sides of the 3000 series Code.

While dual layer composites have been known in the past (see the Singleton patents mentioned above) direct bonding of the high silicon content alloy cladding to the high manganese content alloy core is difficult and in many cases the conventional hot rolling techniques used for bonding different alloy sheets together fail to obtain successful bonds. The failure to obtain consistent hot rolled bonds either results in scrapping of substantial quantities of material during manufacture or requires additional manufacturing time for rerolling. Either situation is, of course, detrimental from an economic point of view for both the manufacturer and user, for the latter has to absorb the cost of wasted materials or time in the increased price of saleable composites.

It has now been discovered that if an alloy sheet of the composition set forth below is placed between the high manganese content and high silicon content alloy sheets and is maintained in contact with both on its opposite surfaces during hot rolling, the intermediate sheet provides a means to obtain consistently good bonding between the two dissimilar alloy outer sheets, resulting in a final bonded composite which has both good bond strength and brazing properties comprable to two-alloy sheets described in the above-mentioned Singleton patents. Normally the materials before rolling are in the form of a high manganese content alloy core ingot with the intermediate layer alloy sheet placed on its surface, with the high silicon content alloy cladding sheet placed on the other side of the intermediate layer alloy sheet. If both sides of the core are to be clad, the same arrangement of intermediate and cladding sheets is also placed on the opposite side of the core ingot.

For brevity herein the high manganese content aluminum alloy material (whether in sheet or ingot form) will often be referred to as the "core" while the high silicon content aluminum alloy sheet will often be referred to as the "cladding". It will be recognized, of course, that the uses may be reversed, both sheets may constitute an outer surface or either or both sheets may be an interior layer of a larger multi-layer composite. Consequently the respective labels of "core" and "cladding" are intended to be illustrative and not limiting.

The compositions of representative materials used respectively for the core and the cladding layers are well known. Typical core materials may be 3003 or 3105 alloys while typical cladding sheets may be 4004 or 4104 alloys. All of these, as well as many other 3000 and 4000 series alloys are described in detail in numerous publications, including the "Registration Record of Aluminum Association Designations and Chemical Composition Limits for Wrought Aluminum and Wrought Aluminum Alloys" published by the Aluminum Association and regularly updated.

The intermediate bonding sheet will be an aluminum alloy having a composition within the following elemental ranges:

| | |
|---|---|
| silicon | 6.8–8.2 wgt. % |
| iron | up to 0.8 wgt. % |
| copper | up to 0.25 wgt. % |
| manganese | up to 0.10 wgt. % |
| zinc | up to 0.20 wgt. % |
| other elements | up to 0.15 wgt. % total |
| aluminum | balance |

This is essentially the composition which is designated "4343 alloy" in the aforementioned "Registration Record".

In the usual practice of this invention, the core ingot and cladding sheet are assembled with a sheet of the intermediate material between them. Thereafter the composite is hot rolled at temperatures in the range of 870° to 1000° F. (465° to 538° C.) and further rolled using normal reductions from the original clad ingot. Repeated use of this hot rolling technique with the intermediate-layer-containing composite has produced uniformly good bonds without delamination and with the external properties of conventional composite sheets containing only the cladding and core without the intermediate bonding sheet.

In typical experiments a five-layer composite material has been made utilizing 3003 alloy as the core and 4104 alloy as the cladding on both sides, with a sheet of 4343 alloy on each side of the core between the core and the cladding sheets.

In comparative experiments where cladding and core alone were used without the intermediate layer, delamination was frequent or initial bonding simply failed to occur during hot rolling.

This invention finds its utility in the metal working industry, particularly in that segment of the industry involving the manufacture and use of aluminum alloy brazing sheets. In addition, the invention has application to the automotive industry and other industries involving metal fabrication where brazing sheets are commonly used.

It will be evident that the above description is intended for illustrative purposes and that there are a number of embodiments not described herein which are within the scope and spirit of the present invention. Consequently, the scope of this invention is to be limited solely by the appended claims.

We claim:

1. A composite brazing material comprising a first layer composed of a 3000 series aluminum alloy, a second layer composed of a 4000 series aluminum alloy and, disposed therebetween and bonded respectively to said first and second layers, an intermediate layer composed of an aluminum alloy having the following composition:

| | |
|---|---|
| silicon | 6.8–8.2 wgt. % |
| iron | up to 0.8 wgt. % |
| copper | up to 0.25 wgt. % |
| manganese | up to 0.10 wgt. % |
| zinc | up to 0.20 wgt. % |
| other elements | up to 0.15 wgt. % |
| aluminum | balance |

2. An article as in claim 1 wherein said first layer comprises the core of the composite and said second layer comprises the cladding of the composite.

3. An article as in claim 2 wherein there are two layers of said cladding with the cladding layers adjacent to opposite surfaces of the core.

4. An article as in claim 3 wherein said 4000 series alloy cladding material is 4104 alloy and said 3000 series core material is 3003 alloy.

5. An article as in claims 1, 2, 3 or 4 wherein said intermediate layer material is 4343 alloy.

* * * * *